United States Patent [19]
Willmore

[11] 3,806,808
[45] Apr. 23, 1974

[54] FREQUENCY DISCRIMINATING APPARATUS

[75] Inventor: Robert R. Willmore, Millersville, Md.

[73] Assignee: Westinghouse Electric Corporation, Pittsburgh, Pa.

[22] Filed: Aug. 23, 1972

[21] Appl. No.: 283,261

[52] U.S. Cl. ............................................ 324/78 R
[51] Int. Cl. .......................................... G01r 23/02
[58] Field of Search ................ 324/78, 77 H, 77 G; 235/181

[56] References Cited
UNITED STATES PATENTS

| | | | |
|---|---|---|---|
| 3,450,869 | 6/1969 | Wiley et al. ...................... | 324/77 H |
| 3,416,081 | 12/1968 | Gutleber et al. ................. | 324/77 H |
| 3,208,065 | 9/1965 | Gutleber et al. ................. | 324/77 H |

Primary Examiner—Alfred E. Smith
Attorney, Agent, or Firm—J. B. Hinson

[57] ABSTRACT

Frequency discriminating apparatus is disclosed for examining a single burst of radio frequency (RF) energy to determine accurately and unambiguously the frequency of the detected burst. In particular, the single burst as detected by a suitable antenna, is gated through an enabled gating circuit to be applied to a recirculating memory, wherein the single burst is circulated and a predetermined, substantially constant delay is imparted thereto to provide an output of a series of corresponding bursts, each delayed with respect to the preceding burst by the predetermined delay. The series of delayed signals is applied to a first input terminal of a single correlator. Significantly, the series of delayed signals as described above is also applied to a switching circuit for successively imparting greater delays to each burst of the series of signals. The series of delayed signals or pulses is applied in turn from the switching circuit to a second input terminal of the correlator. The correlator operates first upon each signal burst and its corresponding delayed burst to split the desired frequency band into a predetermined number, e.g. four, of sectors, and to provide an indication of whether each burst and its corresponding delayed signal burst are positive or negative (with respect to a predetermined level) within a particular sector. In accordance with teachings of this invention, each of the successive plurality of bursts and its corresponding delayed bursts are divided into an increasing number of sectors and are compared by the same correlator to provide a corresponding plurality of output signals which are sotred and read out after each comparison. Further, each set of signals is then stored in an appropriate memory. After the correlator signals corresponding to each of the plurality of bursts and corresponding delayed bursts have been so processed, the correlator signals of the n successive set of signals are compared to determine the frequency of the input burst with a frequency resolution of one part in 4n, where n is equal to the number of sets of signals that are processed sequentially upon the single correlator.

10 Claims, 10 Drawing Figures

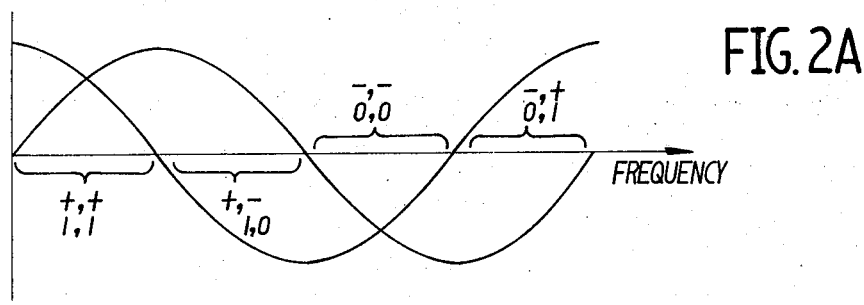
FIG. 2A
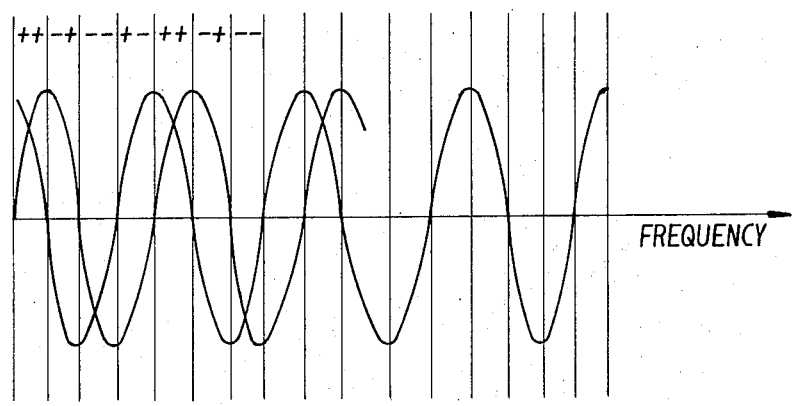
FIG. 2B
FIG. 4A  INPUT
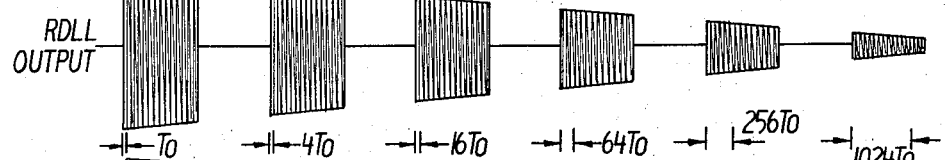
FIG. 4B  RDLL OUTPUT
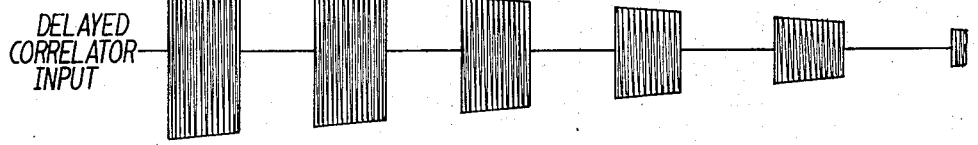
FIG. 4C  DELAYED CORRELATOR INPUT
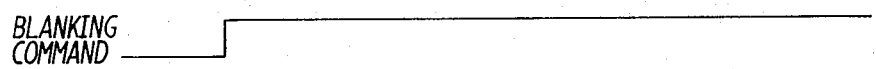
FIG. 4D  BLANKING COMMAND
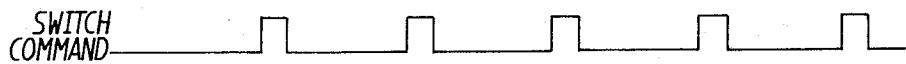
FIG. 4E  SWITCH COMMAND
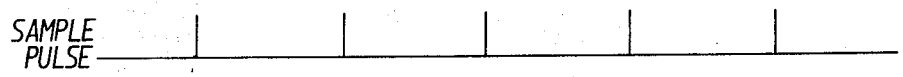
FIG. 4F  SAMPLE PULSE

FREQUENCY DISCRIMINATING APPARATUS

BACKGROUND OF THE INVENTION

1. Field of the Invention

This invention relates to apparatus for sensing and determining the frequency of a signal, and in particular, to such apparatus capable of detecting a single burst of a radar signal and accurately, unambiguously determining the frequency of the detected signal burst.

2. Description of the Prior Art

Monopulse direction finding apparatus is known for detecting the identity of a radar system on the limited basis of detecting a single pulse or burst. Such direction-finding (DF) apparatus can be accomplished by measuring the pulse width and the radio frequency (RF) of the detected pulse. Pulse width sorters capable of determining the pulse width of a detected signal can be easily and inexpensively constructed to operate on a pulse-to-pulse basis. However, it is more difficult, as well as more expensive, to implement an instantaneous frequency discriminator.

With regard to FIG. 1 of the drawings, there is shown frequency discriminating apparatus of the prior art, including an antenna 10 for detecting the transmitted radar signals, an RF amplifier 12 for amplifying and applying the detected signals to a power divider 14 for applying the detected, amplified signals to a plurality of correlators 18a, 18b – 18n and a plurality of delay circuits 16a, 16b – 16n. As seen in FIG. 1, the plurality of correlators 18a, 18b – 18n are connected in parallel, each operating upon a first signal corresponding to the signal burst and a second signal which has been delayed by a specified amount. In particular, the first correlator 18a operates upon a signal burst as derived from the power divider 14 and a second delayed by a period $T_0$ derived from the delay circuit 16a. The second correlator 18b and the remaining correlators 18c – 18n operate upon the first signal burst and a second signal delayed with respect to the first signal burst by successively greater periods than the delay imparted by the delay circuit 16a. For example, the delayed circuit 16b provides a $4T_0$ delay to the second signal to be applied to the second correlators 18b, whereas the delay circuit 16n provides a delay of $4^{n-1}T_0$ to the signal to be applied to the nth correlator 18n. Basically, the correlator 18a operates to split, as shown in FIG. 2A, the first and second input signals applied thereto into four sectors so that the relative polarity of the first and second input signals within each sector may be determined with respect to a predetermined reference level to provide corresponding output signals. In a similar manner, the remaining correlators 18b – 18n divide the first and second input signals thereto into an increasing number of sectors to provide corresponding output signals. The logic and storage circuit 34 compares the output signals derived from the correlator circuits 18a, 18b – 18n to determine accurately the frequency of the signal burst. Typically, frequency discriminator apparatus having a number (n) of correlator-type discriminators connected in parallel can achieve a frequency discrimination to an unambiguous resolution of approximately one part in $4n$.

FIG. 1 shows an illustrative embodiment of a correlator as including a hybrid quadrature circuit 20 for receiving as an input signal the signal burst which may be represented mathematically as $\sin \omega t$ and for providing at a first output terminal 20' a corresponding signal whose phase is unshifted and may be represented as $\sin \omega T$, and a second output signal shifted 90° with respect to the first output signal at output terminal 20'', represented as $\cos \omega t$. The second signal is derived from the delay circuit 16a which imparts a delay $T_0$ to the second signal with respect to the first signal described above. The first signal is applied to input terminals of each of an analog mixer 22 and an analog mixer 24. Illustratively, the analog mixers 22 and 24 may be of the diode type. As seen in FIG. 1, the analog mixer 24 mixes the signal $\sin \omega t$ derived from the hybrid quadrature circuit 20 with the delayed signal $\sin(\omega t + T_0)$ to provide an output signal $\sin \omega t \cdot \sin(\omega t + \omega T_0)$, which signal is applied to a low-pass filter 26 to provide an output signal which may be approximated mathematically as $\frac{1}{2} \cos \omega T_0$. The output signal derived from the low-pass filter 26 is applied to a threshold circuit 30 which is set to provide an indication of whether the input signal is a plus or minus, with respect to a predetermined level, and to provide a corresponding output signal. In a similar manner, the analog mixer 22 mixes the delayed signal $\sin(\omega t + \omega T_0)$ with the signal $\cos \omega t$ derived from the hybrid quadrature circuit 20 to provide an output signal $\sin(\omega t + \omega T_0) \cdot \cos \omega t$. This output signal as derived from the analog mixer 22 is applied in turn to a low-pass filter 28 whose output signal $\frac{1}{2} \sin \omega T_0$ is applied to a threshold circuit 32 for determining the polarity of this signal with respect to the predetermined level and to provide an output signal indicative thereof. With regard to FIG. 2A, the signals derived from the low-pass filters 26 and 28 are both represented; the corresponding threshold circuits 30 and 32 provide a polarity indication of whether its corresponding signal is positive or negative (or 1 and 0) in each of the four quadrants or sectors as blocked off in FIG. 2A.

Significantly, the delay imparted to the second signal of the second correlator 18b is selected to be $4^{m-1}T_0$, where $m = 2$ for the second correlator, i.e. a delay of $4T_0$. It may be understood that the second correlator 18b is constructed similar to the first correlator 18a, and is operative upon the first signal input, i.e., the signal burst and the second signal, which is delayed by a period of $4T_0$ with respect to the first input signal, to further split the desired frequency band into 16 parts as shown in FIG. 2B. It may be understood that the second correlator 18b operates to determine the polarity of both the signals shown in FIG. 2B in each of the 16 sectors to provide corresponding output signals indicative of their polarities. In a similar manner, the third correlator (not shown) operates to split the frequency band into 64 parts and to provide polarity signals for each of the 64 sectors. The number of correlators, of course, will determine the frequency resolution with the nth correlator $18_n$ operating to divide the first and second input signals thereto into $4^n$ sectors and to provide polarity signals for each sector. If six correlators were used, the frequency of a signal burst of 10 GHz may be determined to an accuracy in the order of 2.5 MHz.

Though such a system is capable of accurately, unambiguously determining the frequency of even a single echo burst of a radar system, the cost and complexity as illustrated in FIG. 1 is high because of the use of n correlators.

SUMMARY OF THE INVENTION

It is therefore an object of this invention to accurately, unambiguously determine the frequency of a signal with apparatus of reduced complexity and cost.

It is a more particular object of this invention to achieve accurate determination of the frequency of a single burst of an RF signal, employing only a single correlator.

In accordance with these and other objects, this invention provides a new and improved frequency discriminating apparatus incorporating only a single correlator, for accurately determining the frequency of a single pulse or burst of an RF signal. In particular, the signal whose frequency is to be determined is gated to a recirculating memory for imparting successive delays to the signal of a predetermined period and for applying a series of the re-circulated, delayed signals as the first input to the single correlator. In this manner, a series of pulses or signal bursts corresponding to the original received pulse and delayed by the predetermined period with respect to each other, is applied to the first input terminal of the correlator. Further, the re-circulating memory applies the afore-described series of signal bursts to a switching circuit which delays each of the bursts by an increasing period and applies the delayed signals to a second input of the single correlator. Thus, it may be understood that a set of first and second pulses is applied to the correlator, the second pulse being delayed by a varying period with respect to the first pulse, and that the correlator operates upon this set of pulses to divide the two signal bursts into a corresponding number of sectors and to determine the polarity of each with respect to a predetermined level, to provide output signals indicative of the polarity of both signal bursts.

As a further aspect of this invention, the polarity signals indicative of the relative polarities in each sector of a given set of signal bursts, are read out and applied to an individual memory circuit for each set. In this manner, as the two series of signal bursts are processed by the correlator, the polarity signals for each set of bursts are stored separately and then may be operated upon by a suitable logic circuit after a predetermined n set of signals are processed to determine with the degree of accuracy required, the frequency of the single burst or pulse of the signal detected.

BRIEF DESCRIPTION OF THE DRAWINGS

THese and other objects of the present invention will become more apparent by referring to the following detailed description and accompanying drawings, in which:

FIGS. 2A and 2B illustrate graphically the operation of a correlator to divide a first signal burst and a second delayed signal burst into a given number of sectors and of determining the polarity of each with respect to a predetermined level;

FIGS. 4A to 4F show graphically the operation of the frequency discriminating apparatus shown in FIG. 3.

DETAILED DESCRIPTION OF THE PREFERRED EMBODIMENT

Figure 3:
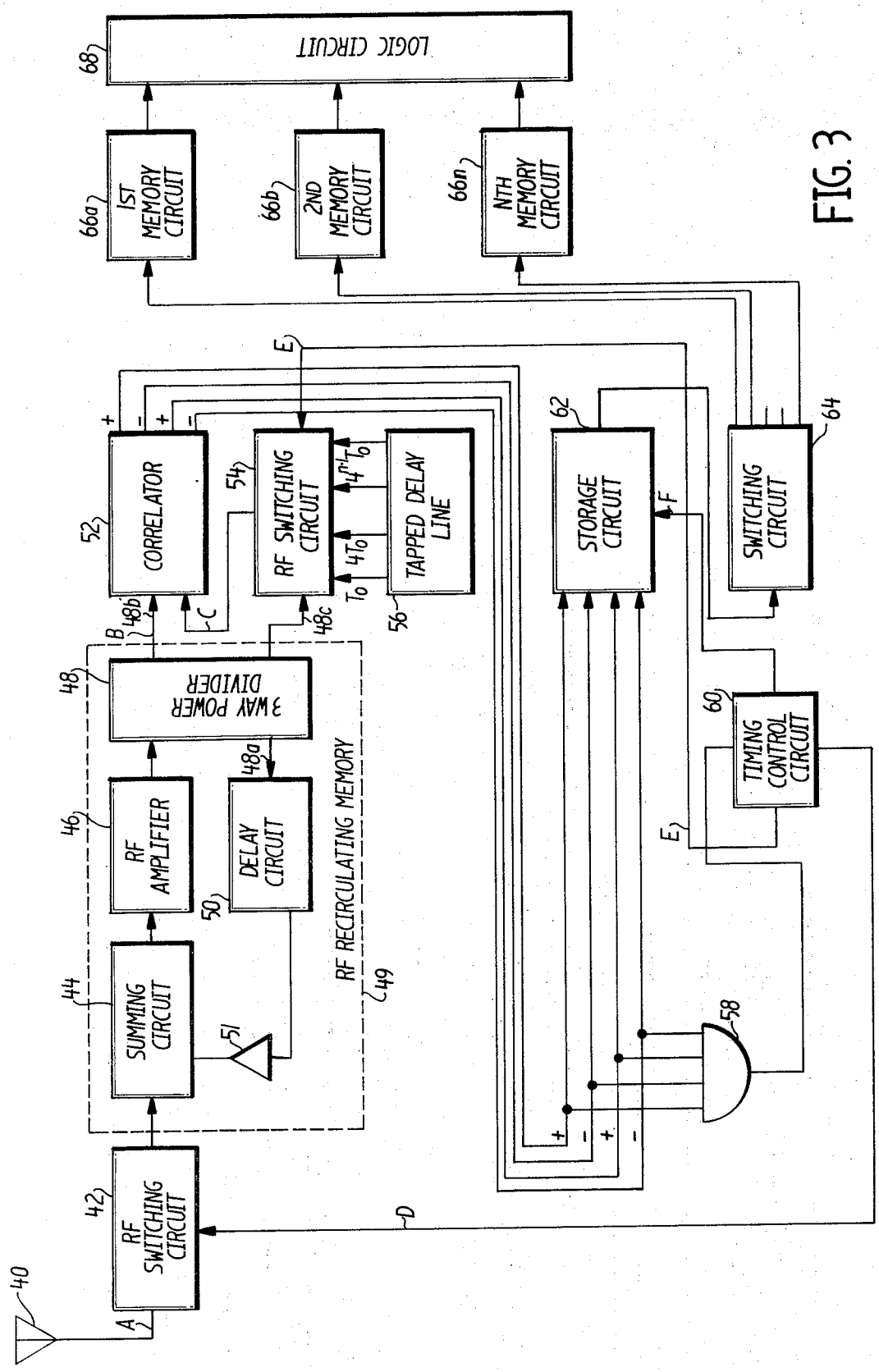
FIG. 3 is a schematic diagram of a frequency discriminating apparatus incorporating but a single correlator in accordance with teachings of this invention.

With regard to the drawings and in particular to FIG. 3, there is shown frequency discriminating apparatus in accordance with the teachings of this invention. In particular, there is included an antenna 40 for sensing a plurality of radio frequency (RF) signals and for applying them to an RF switching circuit 42, for selectively applying to the frequency discriminating apparatus a single burst thereof. As will be explained later, a gating or blanking command signal is derived from a timing control circuit 60 and applied to the RF switching circuit 42 to permit only a single burst of the RF signals to be applied to this apparatus. The gated signal is applied, in turn, to an RF re-circulating memory 49, comprising a summing circuit 44. The summing circuit 44 has another input to which a feedback signal is applied in a manner to be described. The output signal of the summing circuit 44 is applied to an RF amplifier 46 whose amplified signal is applied to a three-way power divider 48. One of the three output simnals, as derived from the terminal 48a of the power divider 48, provides a feedback or re-circulating signal to be applied to a delay circuit 50. As will be explained later, the delay circuit 50 provides a substantially constant delay of $\Delta T$ to each signal applied thereto. The delayed signal derived from the delay circuit 50 is amplified by an amplifier 52 and applied to the second input of the summing circuit 44 to be re-circulated.

As shown in FIG. 3, the second output of the three-way power divider 48 derived from the output terminal 48b is applied as a first input signal to a correlator 52. As will be explained later, a second delayed input will also be applied to the correlator 52. Thus, in summary, the re-circulating memory 49 receives a single burst or pulse of a signal whose frequency is to be determined; the burst is applied at a first instance in time to the three-way divider 48 to provide at terminal 48b a first input signal to the correlator 52. At the same instance, another output signal is derived from the three-way power divider 48 to be delayed and then re-circulated to the three-way power divider 48 to provide at a second instance in time, another signal burst pulse to be applied as the first input to the correlator 52. In this manner, the original burst or pulse may be re-circulated a plurality of times to provide, respectively at output terminals 48b and 48c, first and second series of pulses, both as shown in FIG. 4B. It will be noted that the amplitude of the successive pulses is attenuated by the gain loss imparted thereto by the re-circulating memory 49 and primarily, the three-way power divider 48. In the re-circulating memory 49, RF amplifier 46 and amplifier 51 provide a predetermined gain to permit a given number n of pulses to be derived from the three-way power divider 48 to determine the frequency of the input signal with the degree of accuracy desired, but not such gain as would establish oscillation in this circuit.

As indicated above, a second series of pulses delayed with respect to each other by an interval $\Delta T$ is applied to the input terminal of an RF switching circuit 54. As indicated in FIG. 3, the RF switching circuit 54 is connected to a tap delay line 56 whose taps provide successive delays of $T_0, 4T_0 - 4^{n-1}T_0$. The RF switching circuit 54 acts, in a sense, as a stepping switch under the control of a switch command or gating signal derived from the timing control circuit 60, for selectively increasing the amount of delay imparted to the successive pulses applied thereto from the three-way power divider 48. For example, the first pulse or burst derived from the three-way divider 48 is delayed an interval $T_0$ as shown in FIG. 4C; the second pulse re-circulated through the re-circulating memory 49 and applied to the RF switching circuit 54 is delayed by the tap delay line 56 an interval of $4T_0$. In a similar manner, the successive pulses or bursts are delayed successively by amounts of $16T_0$, $64T_0$, $256T_0$, $1,024T_0 - 4^{n-1}T_0$, where n is the number of times that the single pulse is re-circulated within the re-circulating memory 49 and therefore the number of pulses applied to the correlator 52.

Figure 1:
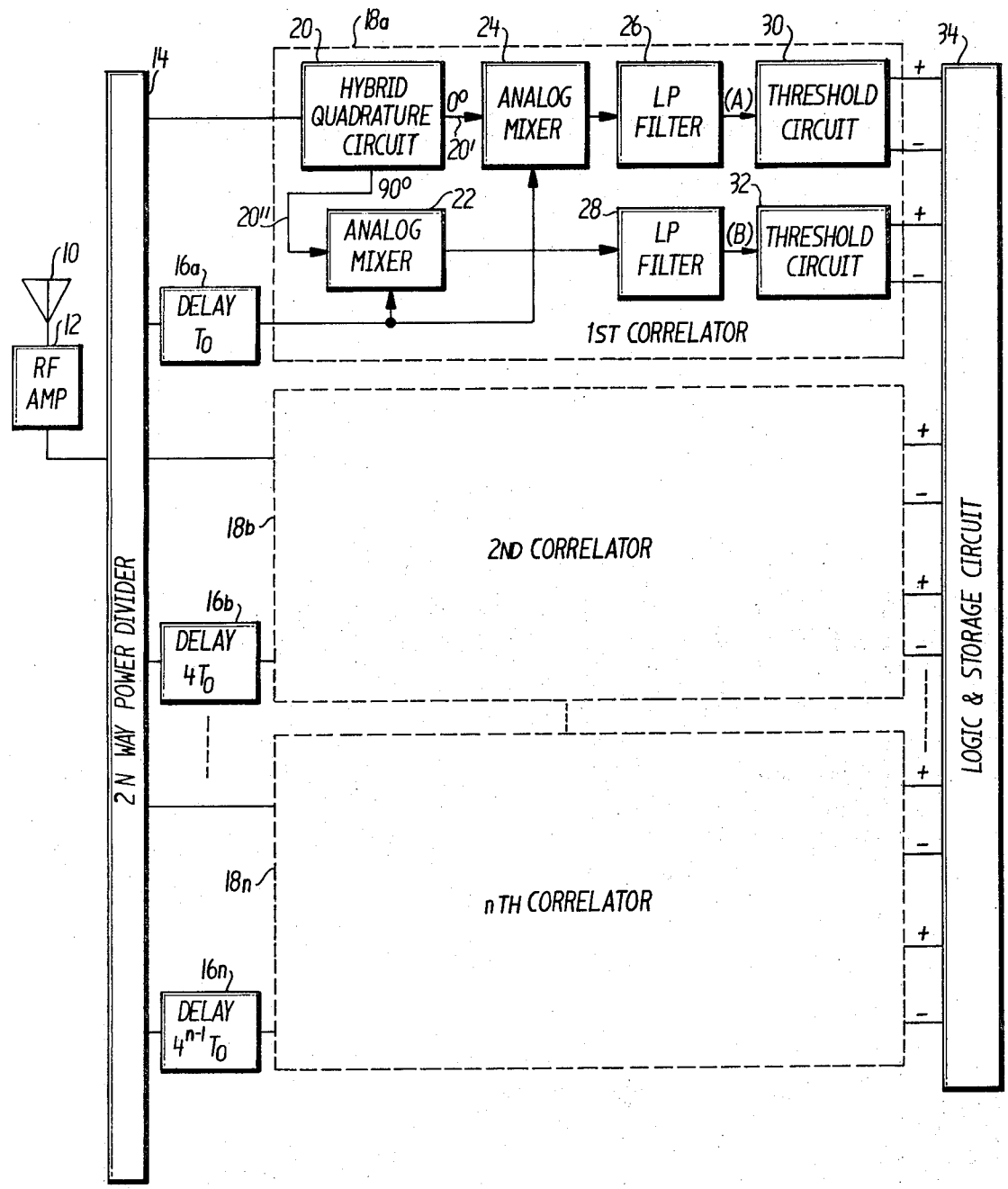
FIG. 1 is a schematic diagram showing a frequency discriminator system of the prior art, incorporating a plurality of parallel-connected correlators.

As is now evident, the series of pulses shown in FIG. 4C, as derived from the output of the RF switching circuit 54, is applied to the second input of the correlator 52. It may be understood that the correlator 52 is similar to the structure of the correlator described in FIG. 1 and operates in substantially the same manner to first divide the frequency band into a predetermined number of sectors and to determine the polarities of each of the input signals with respect to a predetermined level within each of the sectors. As in the operation of the system described with regard to FIG. 1, as successively greater delays are applied to the pulses derived from the RF switching circuit 54, the correlator 52 will operate to divide the input signals into an increasingly greater number of sectors until the desired degree of frequency resolution is obtained.

With regard to FIG. 3, the single correlator 52 provides a series of sets of signals corresponding to each pair of input pulses, any one of which is sensed by four-input OR gate 58 to provide an output signal which is applied to the timing control circuit 60 for providing various timing control signals, as will be explained. As shown in FIG. 4D, the detection of the polarity signals of the input RF burst initiates the timing control circuit 60 to generate a blanking command signal or gating signal to disable the RF switching circuit 42 to prevent another such pulse from being applied to the remaining portion of the circuit shown in FIG. 3, until the processing of the present signal burst is completed. In addition, the timing control circuit 60 generates a plurality of switch command signals as shown in FIG. 4E to be applied to the RF switching circuit 54. Significantly, the switch command signals actuate the RF switching circuit 54 to apply successively greater amounts of delay to the sets of signals derived from the terminal 48c of the three-way power divider 48. The RF switching circuit 54 may be thought of as a stepping switch responsive to each switch command signal to connect the next tap of the delay line 56 in circuit with terminal 48c. In this manner, successively greater delays are applied to the signal bursts, which are to be applied, in turn, to the second input terminal of the correlator 52. In addition, the timing control circuit 60 generates a plurality of sample pulses as shown in FIG. 4F to be applied to the storage circuit 62 to permit the storage circuit 62 to receive the polarity signals as generated by the correlator 52 for each set of pulses applied to the first and second input terminals thereof. As seen in FIG. 4F, the sampe pulses corresponding to the trailing edge of the series of re-circulated echo pulses are applied to the first input terminal of the correlator 52 to facilitate the storage of the polarity signals processed by the correlator 52, in the storage circuit 62. As further shown in FIG. 3, the polarity signals stored in the storage circuit 62 may be periodically read out and applied through a switching circuit 64 to one of a plurality of memory circuits 66. More specifically, the first set of polarity signals corresponding to the first pair of echo signals processed by the correlator 52, is applied by the switching circuit 64 to the first memory circuit 66a; in turn, the next set of polarity signals is applied by the switching circuit 64 to the second memory circuit 66b. The switching circuit 64 continues to apply the sets of polarity signals to their corresponding memory circuits 66, until the nth pair of polarity is stored in the memory circuit 66n. As shown in FIG. 3, the stored contents of the memory circuits 66 are available to the logic circuit 68 for interpreting the data derived from each of the n pairs of echo signals processed by the single correlator 52, to determine the frequency of the single input burst.

At present, the delay circuit 50 determines the number of cycles of which the re-circulating memory 49 is capable and therefore the frequency resolution of this apparatus. As seen in FIGS. 4B and 4C, the delay imparted to the re-circulated signal by the delay circuit 50 is normally greater than that imparted by the tap delay line 56. Illustratively, if the delay circuit 50 could provide a delay in the order of 100–140 Nsec, the re-circulating memory 49 could support five or more loops to achieve a resolution of 10 MHz for an input signal of 10 gHz. There are presently available delay circuits capable of supporting 5 to 20 loops; it is within the present capability of the art to support 30 loops, though the use of such apparatus would require great precision in the feedback amplifier. Though a particular configuration of the re-circulating memory has been shown in FIG. 3, it is understood that other devices including a spin-echo device, could replace the re-circulating memory 49 as shown in FIG. 3. Such a spin-echo device is disclosed in "Detection of Chirped Radar Signals By Means of Electron Spin Echoes," W.B. Mims, IEEE, August, 1963, p. 1,127.

Numerous changes may be made in the above-described apparatus and the different embodiments of the invention may be made without departing from the spirit thereof; therefore, it is intended that all matter contained in the foregoing description and in the accompanying drawings shall be interpreted as illustrative and not in a limiting sense.

What is claimed is;

1. Apparatus for accurately determining the frequency of an input signal, comprising:
   a. memory means for receiving and storing an input signal having a frequency to be detected and providing substantially similar first and second series of output signals $S_1$, $S_2 - S_m$, $- S_n$, where $S_1$ is the first signal, $S_n$ is the nth signal and m may be 1 to n, said memory means imposing a predetermined delay between one of the output signals $S_m$ and the preceding output signal $S_{m-1}$;
   b. delay means for imparting successively increasing delays to the output signals of the second series to provide therefrom a third series of output signals $S'_1$, $S'_2$, $- S'_m$, $- S'_n$; and
   c. correlator means for processing sequentially the corresponding sets of output signals $S_m$ and $S'_m$ of the first and third series of output signals, whereby each set of the output signals $S_m$ and $S'_m$ is placed into sectors and said correlator means provides output signals indicative of the polarity with regard to a predetermined level, of each of the output signals $S_m$ and $S'_m$ of the set in each sector, the number of sectors into which the set of corresponding signals $S_m$ and $S'_m$ is divided being greater than the number of sectors into which the set of corresponding signals $S_{m-1}$ and $S'_{m-1}$ is divided.

2. Apparatus as claimed in claim 1, wherein there is included gating means operative in a first mode to permit a single input signal to be applied to said memory means and operative in a second mode during the operation of said memory means to provide the first and second series of $n$ output signals to inhibit the application of input signals to said memory means.

3. Apparatus as claimed in claim 1, wherein said delay means imparts a delay of $4^{m-1}T_0$ to each of the output signals $S'_m$ of the third series with respect to each of the corresponding output signals $S_m$ of the first series.

4. Apparatus as claimed in claim 1, wherein said delay means includes a switching circuit and a tapped delay line having a plurality of taps for presenting thereat increasing delays, said switching circuit applying the second series of output signals across selected taps of said delay line whereby increasing delays are imparted to the second series of output signals.

5. Apparatus as claimed in claim 4, wherein there is included timing control means responsive to each set of polarity output signls derived from said correlator means to actuate said switching circuit to apply the succeeding output signal of the second series across the next tap of said delay line whereby a greater delay is presented to the succeeding output signal of the third series.

6. Apparatus as claimed in claim 5, wherein there is further included storage means responsive to a signal derived from said timing control circuit for facilitating the storage of a single set of polarity signals as derived from said correlator means.

7. Apparatus as claimed in claim 6, wherein there is further included 1st, 2nd, – and $n$ memory means for receiving and storing the 1st, 2nd, – and $n$th sets of polarity signals as derived from said correlator means, and logic circuit means for receiving and interpreting the 1st, 2nd, – $n$th sets of polarity signals to provide a manifestation of the frequency of the input signal.

8. Apparatus as claimed in claim 1, wherein said correlator means divides each set of the corresponding signal $S_m$ and $S'_m$ into $4^m$ sectors.

9. Apparatus as claimed in claim 1, wherein said memory means includes divider means responsive to an input signal to provide a corresponding output signal at each of first, second and third output terminals, delay means associated with said third output terminal to provide a predetermined delay to the signal applied thereto, and means for applying the delayed signal to said divider means to provide at said first and second output terminals the first and second series of output signals.

10. Apparatus as claimed in claim 9, wherein said divider means imparts to the signals provided at said first, second and third output terminals, a given loss, and said applying means includes means for amplifying the signal derived from said third output terminal to be applied as the input signal of said divider means.

* * * * *